United States Patent
Piagentini et al.

(10) Patent No.: US 12,020,039 B2
(45) Date of Patent: Jun. 25, 2024

(54) COMPUTE INSTANCE WARMUP OPERATIONS

(71) Applicant: salesforce.com, inc., San Francisco, CA (US)

(72) Inventors: Federico Ariel Piagentini, Buenos Aires (AR); Santiago Vacas, Buenos Aires (AR)

(73) Assignee: San Francisco, CA, San Diego, CA (US)

( * ) Notice: Subject to any disclaimer, the term of this patent is extended or adjusted under 35 U.S.C. 154(b) by 296 days.

(21) Appl. No.: 17/410,398

(22) Filed: Aug. 24, 2021

(65) Prior Publication Data
US 2023/0066698 A1 Mar. 2, 2023

(51) Int. Cl.
| G06F 9/00 | (2018.01) |
| G06F 8/60 | (2018.01) |
| G06F 9/24 | (2006.01) |
| G06F 9/445 | (2018.01) |
| G06F 15/177 | (2006.01) |

(52) U.S. Cl.
CPC ............... *G06F 9/445* (2013.01); *G06F 8/60* (2013.01)

(58) Field of Classification Search
CPC .................................. G06F 9/445; G06F 8/60
See application file for complete search history.

(56) References Cited

U.S. PATENT DOCUMENTS

| 10,713,072 | B1 * | 7/2020 | Burgin | G06F 9/5077 |
| 10,761,893 | B1 * | 9/2020 | Bhadauria | G06F 9/5044 |
| 10,877,796 | B1 * | 12/2020 | Kinney, Jr. | G06F 9/4843 |
| 11,163,669 | B1 * | 11/2021 | Torun | G06F 8/65 |
| 11,526,286 | B1 * | 12/2022 | Li | G06F 3/0604 |
| 2021/0132975 | A1 * | 5/2021 | Chandrashekar | G06F 21/53 |
| 2021/0149735 | A1 * | 5/2021 | Huang | G06F 9/4881 |
| 2021/0168027 | A1 * | 6/2021 | Parulkar | G06F 9/4856 |
| 2024/0054501 | A1 * | 2/2024 | Crossman | G06Q 30/016 |

\* cited by examiner

*Primary Examiner* — Mohammed H Rehman
(74) *Attorney, Agent, or Firm* — Holland & Hart LLP

(57) ABSTRACT

Methods, apparatuses, and computer program products are described. An application server may create a compute instance associated with a pool of compute instances. The application server may select, based on one or more operation usage metrics that may indicate operations previously performed by compute instances in the pool of compute instances, a set of initialization operations from a plurality of available initialization operations. The application server may retrieve, at the compute instance, the set of initialization operations based on the selecting. The application server may perform the set of initialization operations with the compute instance as part of a compute instance warmup process in response to the compute instance being created. The application server may indicate the compute instance as an available compute instance in the pool of compute instances based on the compute instance warmup process.

20 Claims, 11 Drawing Sheets

COMPUTE INSTANCE WARMUP OPERATIONS

FIELD OF TECHNOLOGY

The present disclosure relates generally to database systems and data processing, and more specifically to compute instance warmup procedures.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some data processing contexts, users may use established systems to carry out data processing. Such data processing may be carried out using one or more compute instances or "workers" and may, in some cases, avoid one-to-one provisioning of compute instances. Such a system may sometimes be referred to as a "serverless" system. In such a system, compute instances may be created and destroyed routinely as tenants perform their data processing tasks using the system. However, as each compute instance is created, various operations are performed to ready the compute instance for use by the user. In some cases, such operations may cause excessive delays, and a tenant may not be able to access or use the compute instances during such delays.

DETAILED DESCRIPTION

The approaches described herein detail a scheme for "warm-up" of a compute instance once it is created to reduce or eliminate the delays present in other approaches. Once a compute instance is created, the compute instance may be "warmed-up" by automatically performing operations to prepare the compute instance for use. For example, the compute instance may automatically load a selection of classes, download dependencies, or perform other operations. In some examples, the compute instance may "exercise" classes or dependencies to determine one or more initialization operations that the class or dependency may perform to become ready for use for the tenant. Once the compute instance is "warmed up" by performing a set of initialization operations, the compute instance may be indicated as an available compute instance in a pool of compute instances. In this way, the technical problems present in using "cold" compute instances are reduced or eliminated, since associated delays in starting up a compute instance after it is requested are reduced or eliminated.

Additionally or alternatively, the system may also track tenants' use of various operations or resources (e.g., classes, dependencies, etc.) that a compute instance may use. Based on this tracking, the system may identify one or more commonly used procedures or resources (e.g., activities, commands, classes, dependencies, etc.), and these procedures or resources may automatically be performed or accessed upon starting up a new compute instance, thereby providing an effective "warm-up" of a compute instance that reduces or eliminates delays present in other approaches. In some examples, metrics may be determined based on an analysis of previously performed operations and whether they were successfully performed or not or by other measures of operation performance. Additionally or alternatively, a warm-up timer may be used to ensure that, even if a warmup sequence is not completed, the compute instance is still made available to the pool. Additionally or alternatively, a repository of available initialization operations may be maintained by the application server or by other means, so that the initialization operations that are selected to be used by the compute instance in its warmup process may be of the latest versions available, and may be helpful in reducing or eliminating delays in provisioning of the compute instance.

Aspects of the disclosure are initially described in the context of an environment supporting an on-demand database service. Aspects of the disclosure are then illustrated by and described with relation to example data processing systems and a process flow. Aspects of the disclosure are further illustrated by and described with reference to apparatus diagrams, system diagrams, and flowcharts that relate to compute instance warmup procedures.

Figure 1:
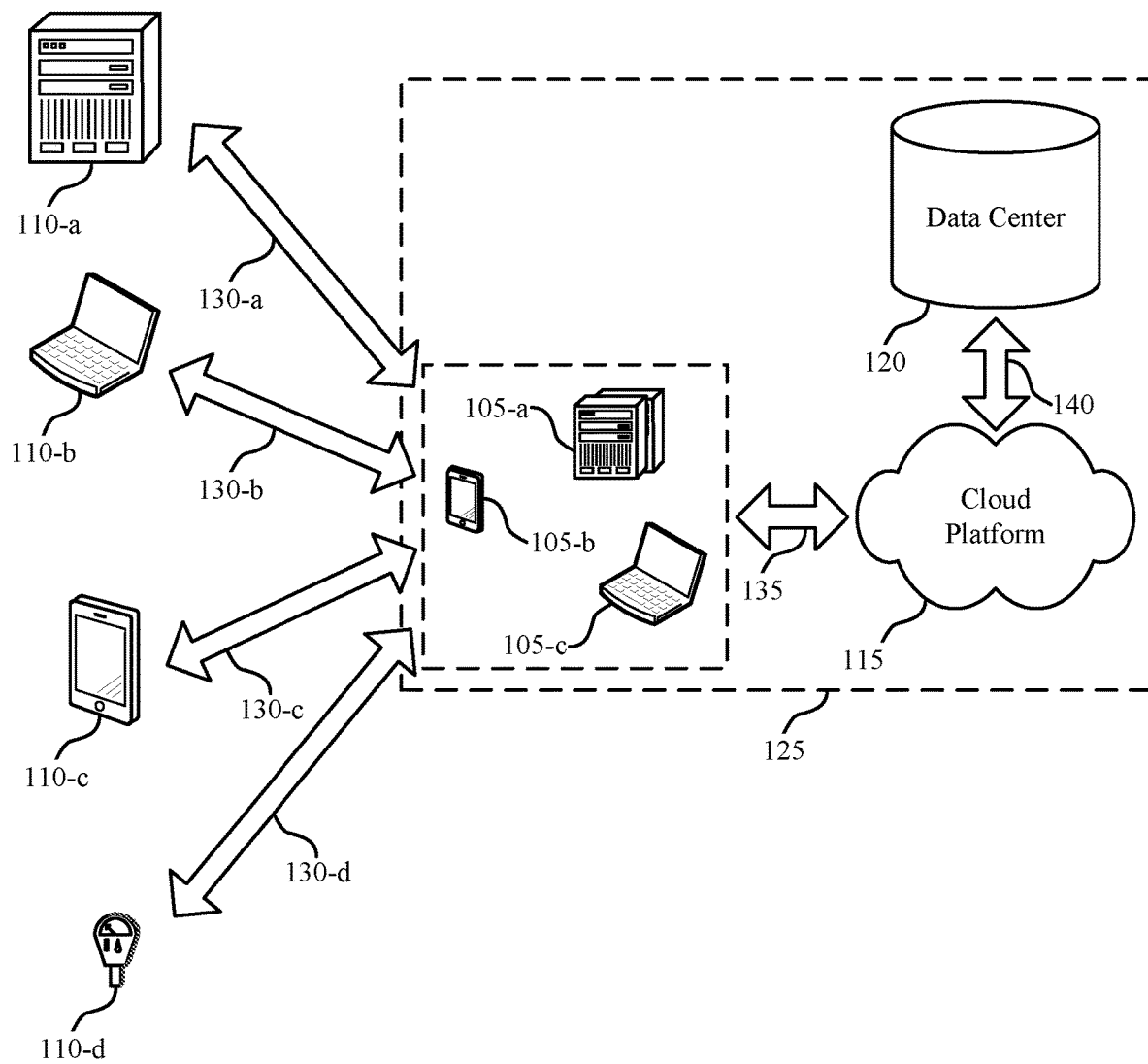
FIG. 1 illustrates an example of a data processing at an application server system that supports compute instance warmup procedures in accordance with aspects of the present disclosure.

FIG. 1 illustrates an example of a system 100 for cloud computing that supports compute instance warmup procedures in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

For example, before a cloud client 105 may request the use of a compute instance, the cloud platform 115 may obtain and analyze one or more operation usage metrics to determine or select a plurality of initialization operations that may be available for selection in a warmup process. The cloud platform 115 may also include or communicate with a pool of compute instances, and the cloud platform 115 may create or provision a compute instance for use within the pool of compute instances. As part of a warmup process for the compute instance, the cloud platform 115 may select or retrieve a set of initialization operations from the plurality of initialization operations for the compute instance to perform. The compute instance may then perform the set of initialization operations and the cloud platform 115 may indicate that the compute instance is available for a cloud client 105 to use (e.g., by sending one or more API requests for a data processing task).

Some alternative approaches may present technical problems. For example, when a compute instance is created for the first time, it may take an excessive amount of time for the compute instance to be ready to perform a data processing task. For the compute instance to be ready for use, it may download additional information (e.g., dependencies, classes, related information, or other elements) or perform various operations (e.g., connectivity testing, retrieval of relevant information with which the user may interact, determining formatting or expected values for other elements working with the compute instance, application testing for debugging purposes, or other operations). Because of these delays, the compute instance is not available to the user. In some examples of a serverless solution that includes an application programming interface (API), these delays in startup may make any API requests made to be too slow to be useful for users of the serverless solution.

The approaches herein may reduce or eliminate such delays in provisioning of compute instances and may make API requests more useful for users in a serverless architecture. Because the approaches herein provide an automatic warmup procedure, many of the delays may be reduced or eliminated, since the downloading of additional information, performance of operations, or both, may be performed before the compute instance is called on by a user. Additionally or alternatively, a system may keep track of previously performed operations and gather metrics on those previously performed operations to determine a dynamic, updateable record of which operations are most likely to be used by a compute instance at a given time. Then, during such a warmup sequence, these operations that are most likely to be used may be performed before the compute instance is used to perform a data processing task. In this way, the delays present in other compute instance provisioning approaches may be reduced or eliminated.

For example, a user may desire to perform a data processing task using one or more compute instances in a pool of compute instances. The user may then call on a compute instance to perform a task. However, before the compute instance has been made available to the user, it has already been warmed up by the system. The system has been tracking the use of various operations by previously-provisioned compute instances, and has been tracking various metrics associated with these operations. Once the system has obtained and analyzed these metrics, the system may determine which operations should be automatically performed during a warmup process. Thus, when the user requests the use of a compute instance, many or all of the procedures that would otherwise be performed while the user waits for the compute instance to begin processing (e.g., an API request) are reduced or eliminated, more efficient data processing and a better user experience.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims. It should be further noted that aspects, elements, numbered elements, or other items discussed herein may be considered, though not necessarily so, to be examples of or related to other items bearing a similar name, even though they may be discussed in the context of different figures or may bear different reference numbers referring to aspects of the figures.

Figure 2:
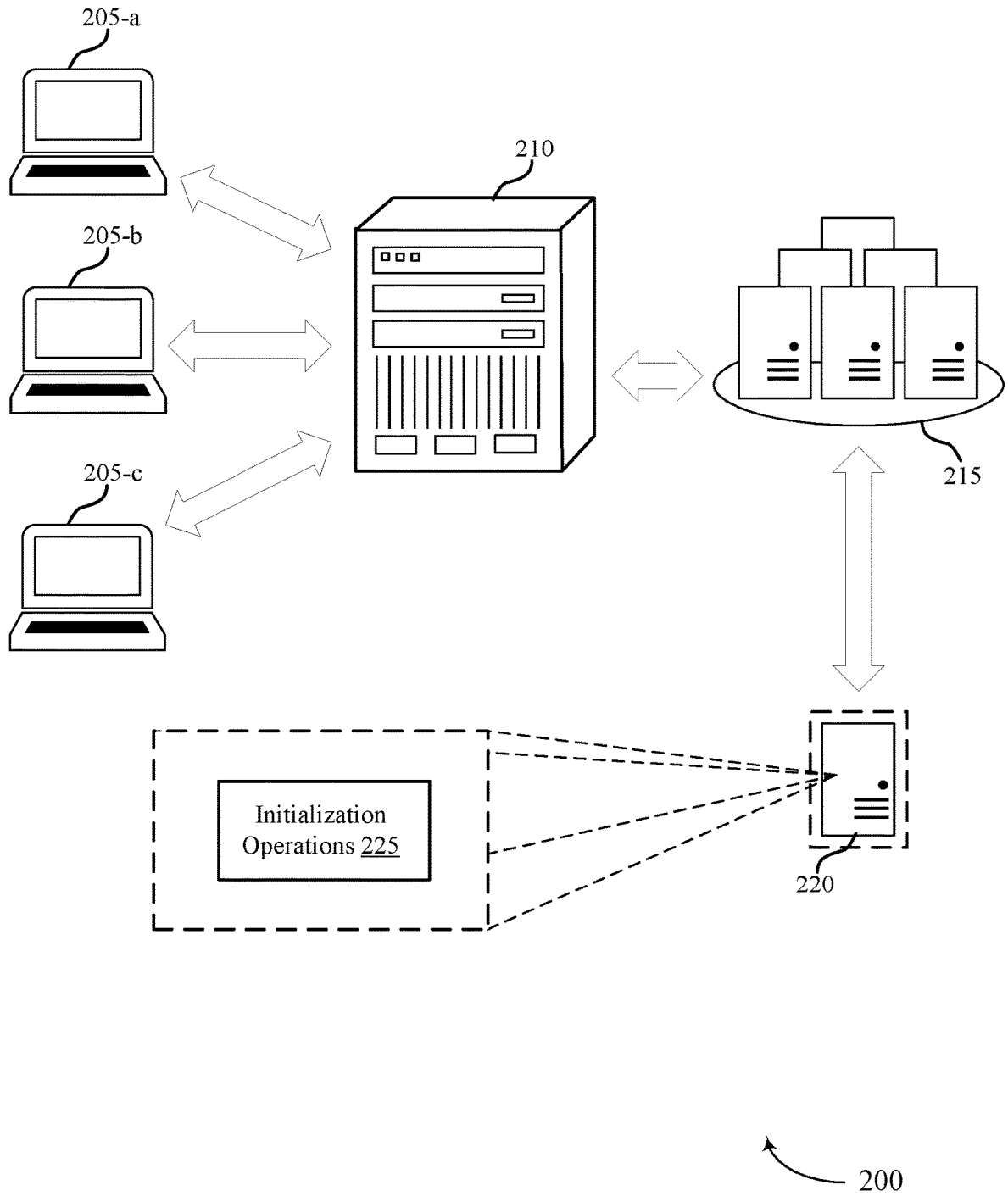
FIG. 2 illustrates an example of a system that supports compute instance warmup procedures in accordance with aspects of the present disclosure.

FIG. 2 illustrates an example of a system 200 that supports compute instance warmup procedures in accordance with aspects of the present disclosure. The system 200 may include clients 205, application server 210, compute instance pool 215, and compute instance 220. The compute instance 220 may perform one or more initialization operations 225 as part of a compute instance warmup procedure. Though the approaches described herein may be described in examples where certain elements of the system 200 perform certain operations, it is to be understood that other elements of system 200 or other elements not shown in relation to system 200 may also perform operations described herein.

As described herein, an application server 210 may create a compute instance 220 and engage in a warmup procedure to prepare the compute instance 220 for use by a client 205. In some examples, the application server 210 may create a new compute instance 220 based on one or more factors, including a number of existing compute instances 220 in the compute instance pool 215 (e.g., if the number of existing compute instances 220 falls below a threshold, a new compute instance may be created), the destruction or termination of an existing compute instance 220 (e.g., once a client 205 finishes with the use of the compute instance 220, the compute instance 220 may be destroyed to avoid data leaks between compute instances 220 or across users, organizations, companies, or other groups), a scaling operation performed on the compute instance pool 215 (e.g., a scaling operation to increase or decrease the number of compute instances 220 in the compute instance pool 215), or other operation related to a compute instance 320 or the compute instance pool 315.

Once the application server 210 creates a new compute instance 220, the application server 210 may engage in a warmup procedure associated with the compute instance 320. In some examples of a warmup strategy or procedure, the application server 210 may select a set of initialization operations 225 from a plurality of initialization operations available to the application server 210. In some examples, the application server 210 may select the set of initialization operations 225 based on one or more operation usage metrics collected or analyzed by the application server 210 or other element of the system 200.

The compute instance 220 may retrieve (or the application server 210 may provide) the selected set of initialization operations that the compute instance 220 is to perform during a warmup procedure. The compute instance 220 may perform the set of initialization operations 225 and may do so in response to the application server 210 creating the compute instance 220. Such initialization operations 225 may include a variety of different operations, including connectivity testing (e.g., testing connectivity with an external service based on a connection to the external service, associated configuration parameters, or both), obtaining a list of objects used in the system (e.g., information or selections about customers, opportunities, assets, or other elements), obtaining metadata associated with one or more objects, obtaining sample data from a connection to an internal or external service (e.g., obtaining or determining what types, formats, or organizations of data that such a connection may expect as input or return to the compute instance 220 or a client 205 as output), application testing (e.g., running an application that may employ one or more connections to internal or external services, optionally obtaining logs, debugging information, or other information upon running the application), or a combination thereof. Additionally or alternatively, the initialization operations 225 may include downloading or loading one or more resources used by the compute instance 220 (e.g., dependencies, classes, or other resources). Further, the initialization operations 225 may include combinations of downloading or loading, as well as the operations described herein (e.g., downloading a dependency and application testing using an application that uses the dependency). Further, the initialization operations 225 may include exercising one or more connections to internal or external services, so that related resources, connections, information, formats, metadata, or other information may be collected, determined, selected, or otherwise obtained by the compute instance 320. In this way, the compute instance 320 may be better prepared to respond to commands or requested from a client 205 in a way that reduces delays present in other approaches.

In some examples, one desired result of the warmup strategy is that each compute instance 220 undergoing the warmup process will have performed the initialization operations 225 to be prepared for receiving and performing data processing tasks (e.g., each compute instance 220 may have a classloading done for a set of classes associated with operations that may be requested by a client 205, may have downloaded or loaded a set of dependencies associated with operations that may be requested by a client 205). In some examples, such a warmup strategy may be performed automatically upon the creation of the compute instance 220 by the application server 210 or other element or elements.

In some examples, after the compute instance performs the initialization operations 225, the application server 210 may indicate that the compute instance 220 is an available compute instance (e.g., that the compute instance 220 has performed one or more operations that enable the compute instance 225 to perform a data processing task requested by a client 205). Additionally or alternatively, the application server 210 may indicate to the clients 205 that the compute instance 220 may be available for use for a data processing task (e.g., a command or request provided through an API by a client 205).

Figure 3:
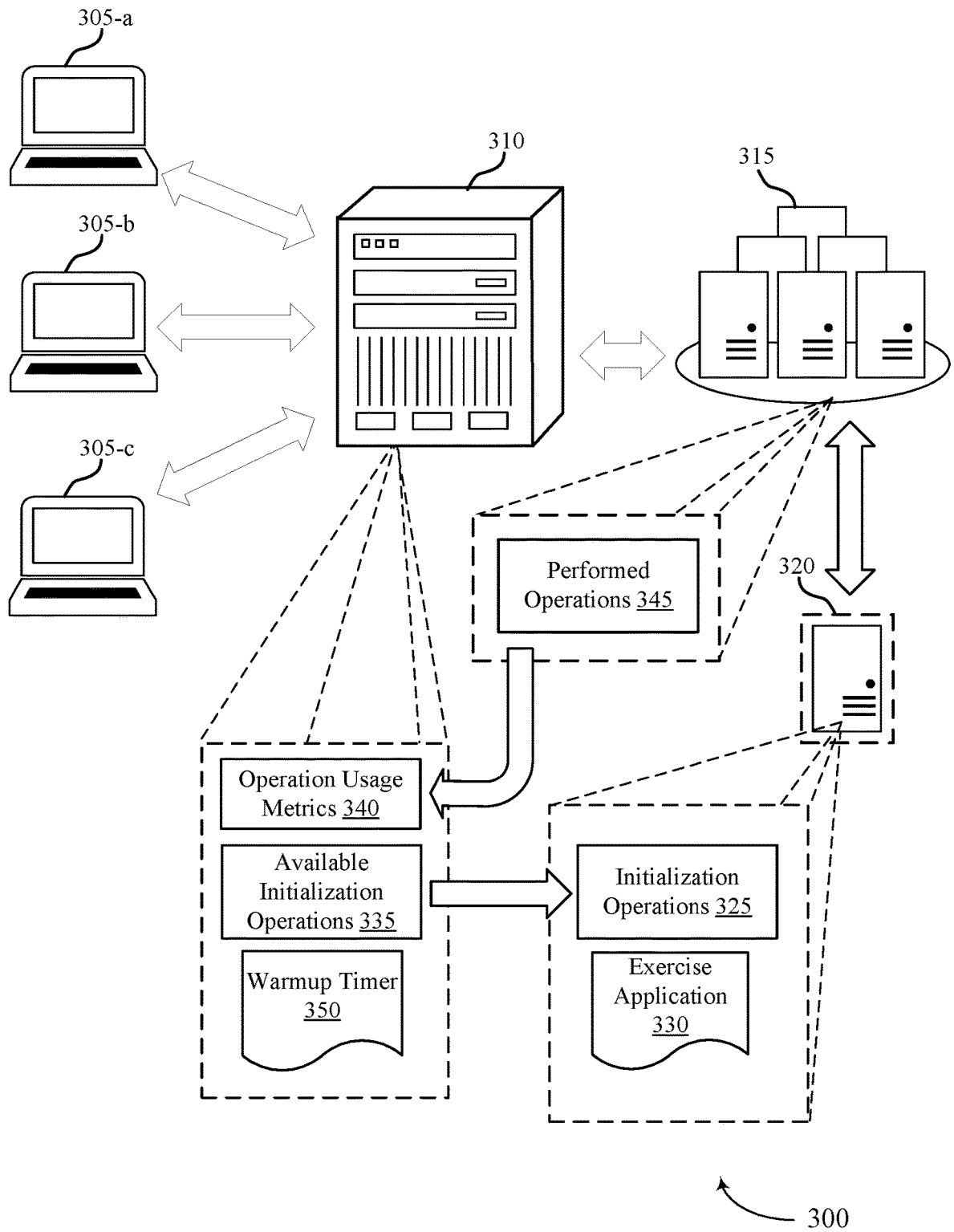
FIG. 3 illustrates an example of a system that supports compute instance warmup procedures in accordance with aspects of the present disclosure.

FIG. 3 illustrates an example of a system 300 that supports compute instance warmup procedures in accordance with aspects of the present disclosure. The system 300 may include clients 305, application server 310, compute instance pool 315, and compute instance 320. The compute instance 320 may perform one or more initialization operations 325 as part of a compute instance warmup procedure.

In some examples, the application server 310 may gather information about performed operations 345 by one or more compute instances in the compute instance pool 315. For example, if a compute instance of the compute instance pool 315 had previously performed operations (e.g., the performed operations 345) including downloading a dependency and a class for use in connection with a data processing task, the application server 310 may store a record indicating that the compute instance had download the dependency and the class. The application server 310 may use this record (and perhaps in connection with other records) to determine one or more operation usage metrics 340 that may indicate these previously-performed operations. For example, if the application server 310 determines that the operations performed by the compute instance of the compute instance pool 315 are operations that are commonly performed (or meet other criteria), the application server 310 may indicate that the operations are to be included in a warmup procedure or are to be included in the available initialization operations 335, and the application server 310 may indicate that the operations should be retrieved at the compute instance 320 during or in preparation for a warmup procedure.

For example, the application server 310 may determine or analyze additional criteria or related procedures for determining which initialization operations 325 should be performed during a warmup process or provided as part of the available initialization operations 335. For example, the application server 310 may monitor the compute instance pool 315 and the performed operations 345 that are performed by one or more compute instances in the compute instance pool, and may determine, analyze, store, or otherwise process results of the monitoring. For example, the application server 310 may parse information (e.g., identifiers) of connections to internal or external services used in an operation such as one of the performed operations 345 (e.g., a successful operation), store a number of times that an operation (e.g., one or the performed operations 345) is performed (e.g., how many times a connection to an internal or external service is used, and optionally whether it was used successfully or unsuccessfully), rotate or reset one or more usage records, statistics, or metrics (e.g., one or more of the operation usage metrics 340) to allow for fairness of "competition" between candidate operations, selecting a latest version of an operations, dependency, class, or other resource, adding or removing an operations, dependency, class, or resource to or from a whitelist (e.g., a list including such elements that are approved for use) or a blacklist (e.g., a list including such elements whose use is forbidden). In some examples, the application server 310 may determine the operation usage metrics 340 based on other factors, including a successful execution of one or more operations, an unsuccessful execution of one or more operations, a number of executions of one or more operations, one or more operation metric thresholds, one or more flags associated with one or more performed operations 345 or initialization operations 325 (e.g., a flag that may indicate that a particular performed operation 345 should or should not be considered in the determination of the operation usage metrics 340), or a combination thereof. For example, if an operation is successful, an operation usage metric 340 may be adjusted to favor an operation, whereas a failed operation may be a factor that the application server 310 may use to adjust an operation usage metric 340 to disfavor the failed operation. Further, the application server 310 may determine or adjust the operations usage metrics 340 to be associated with a period of time (e.g., a month, a year, or other time period). In some examples, the application server 310 may adjust the operations usage metrics 340 based on usage (e.g., of the performed operations 345) during the period of time so that the application server 310 may capture new usage trends in the performed operations 345 and deliver more accurate and updated operation usage metrics 340 to be used in selecting the available initialization operations 335 as well as initialization operations 325 for a particular compute instance 320. In some examples, the application server 310 may maintain a queue of a number of usage counters, and each counter may represent a period of time (e.g., a day). As each period of time passes (e.g., a day passes), the oldest usage counter in the queue may be deleted, and a new usage counter may be created for the recent passage of the period of time.

Additionally or alternatively, such a warmup strategy or procedure may include or implement other approaches. For example, a warmup strategy may include deploying an empty or exercise application 330 that may be used to train or exercise resource downloaders (e.g., a classloader), executing one or more samples of data processing tasks or operations (e.g., operations that may be representative of operations that a client 305 may request to be performed by the compute instance 320), or other operations or procedures. Such an exercise application 330 may make connections to internal or external services or data sources, may perform one or more of the initialization operations 325, or both. Additionally or alternatively, the exercise application 330 may also download or load one or more resources that are used in the operation of an application so that the compute instance 320 may already have access to such resources (e.g., dependencies, classes, etc.) upon finishing the warmup process and beginning to receive commands from a client 305. Additionally or alternatively, the application server 310 may select the available initialization operations 335 or the initialization operations 325 based on a user identifier (e.g., a user identifier associated with a client 305), an organization associated with a user identifier, or a combination thereof. For example, the application server 310 may track the performed operations 345, the operation usage metrics 340, or both, on a per-user, per-client 305, per-organization, or per-group based. For example, users or clients 305 from a particular company may utilize some performed operations 345 at a first rate, but users or clients 305 from another company may not use those some performed operations 345 at the same rate, or not at all. Thus, the application server 310 may track the performed operations 345, the operation usage metrics 340, or both to provide reduced or eliminated delays and better user experiences to different users, organizations, groups, or companies that are tailored to particular requirements.

In some instances, the application server 310 may utilize a warmup timer 350 (e.g., to ensure that, even if a compute instance 320 takes longer than expected to perform the initialization operations 325, the compute instance 320 may still become available to a client 305 for use in connection with a data processing job). For example, the application server 310 may detect that a compute instance 320 has begun a warmup process (e.g., has begun retrieving or performing the initialization operations 325 or other operation acting as a trigger for the warmup timer 350). Upon expiration of the warmup timer 350 (whose time may be configured by a client 305, an administrator, or determined automatically based on the performed operations 345, the operation usage metrics, or other information collected, analyzed, or obtained automatically by an element of the system 300), the application server 310 may indicate that the compute instance 320 is available for use to a client 305. Additionally or alternatively, the application server 310 may utilize additional criteria to determine that the compute instance should be indicated as available. For example, the application server 310 may determine that the warmup timer 350 has expired and that at least a portion of a warmup process has not been performed successfully (e.g., that one or more of the initialization operations 325 failed, was not performed at all, or a combination thereof).

In some examples, the application server 310 may maintain the available initialization operations 335 (and, by extension, may optionally maintain the initialization operations 325 that may be used by the compute instance 320). For example, the application server 310 may update the available initialization operations 335 (e.g., by changing an operation to download a dependency or class to direct the download to a newly released version of the dependency or class). Additionally or alternatively, the application server 310 may remove an operation from the available initialization operations 335 or the initialization operations 325, and, in some examples, may do so based on the performed operations 345, the operation usage metrics 340, or other factors, all as described herein. In some examples, the application server 310 may validate or otherwise analyze the addition, removal, or modification of an operation from the available initialization operations 335. For example, the application server 310 may analyze a warmup procedure of a first compute instance 320 that included an initialization operation 325 and compare the warmup procedure to a warmup procedure of a second compute instance 320 that does not include the initialization operation. Such a comparison may provide additional data (e.g., an impact on the time used for the warmup procedures with or without the initialization operation in question) that the application server may use to update the operation usage metrics 340. Additionally or alternatively, the application server 310 may determine, detect, or otherwise obtain an indication that a compute instance 320 performs better or worse (e.g., in terms of time, efficiency, accuracy, completeness, or other metrics) after having an initialization operation 325 added or removed to a warmup procedure.

In some examples, the application server 310 may perform a procedure for adding additional initialization operations to the available initialization operations 335. For example, the application server 310 may perform a warmup procedure with a new initialization operation 325 on a single compute instance 320, and may perform the warmup procedure without the new initialization operation on a number of other compute instances 320. The application server 310 may then monitor the compute instance 320 with the newly added initialization operation 325 to determine whether the warmup procedure was completed successfully. If so, the application server 310 may then include the new initialization operation 325 in the available initialization operations 335 for use by other compute instances 320. However, if the test case compute instance 320 does not successfully complete, then the application server 310 may not add the include the new initialization operation 325 in the available initialization operations 335 for use by other compute instances 320, to avoid a situation in which multiple compute instances 320 fail the warmup procedure, thereby impacting availability of the compute instances 320 to the clients 305.

Further, the application server 310 may determine, detect, or otherwise obtain information about potential risks that may occur by adding or removing an initialization operation from the available initialization operations 335. For example, the application server 310 may monitor for errors that may stop a warmup procedure, thereby degrading the performance of the service (e.g., the compute instance 320 may be indicated as available, but one or more portions of the warmup procedure did not execute properly). Similarly, the application server 310 may monitor for errors that may make the compute instance 320 restart. For example, such errors could cause workers to be in a constant restart loop, and the compute instance may be delayed in becoming available or may never be indicated as available. The application server 310 may also monitor for additional errors, such as duplication of actions between initialization operations 325 (e.g., loading a dependency, class, or application multiple times). Additionally or alternatively, the application server 310 may monitor for failures associated with one or more downloaded or loaded resources (e.g., dependencies, classes, applications, or other resources). For example, the application server 310 may detect that a particular dependency is failing, and may then exclude the dependency from use by a compute instance 320 during a warmup procedure. If the issue with the dependency is resolved, the application server 310 may allow the dependency to be used in a warmup procedure.

Figure 4:
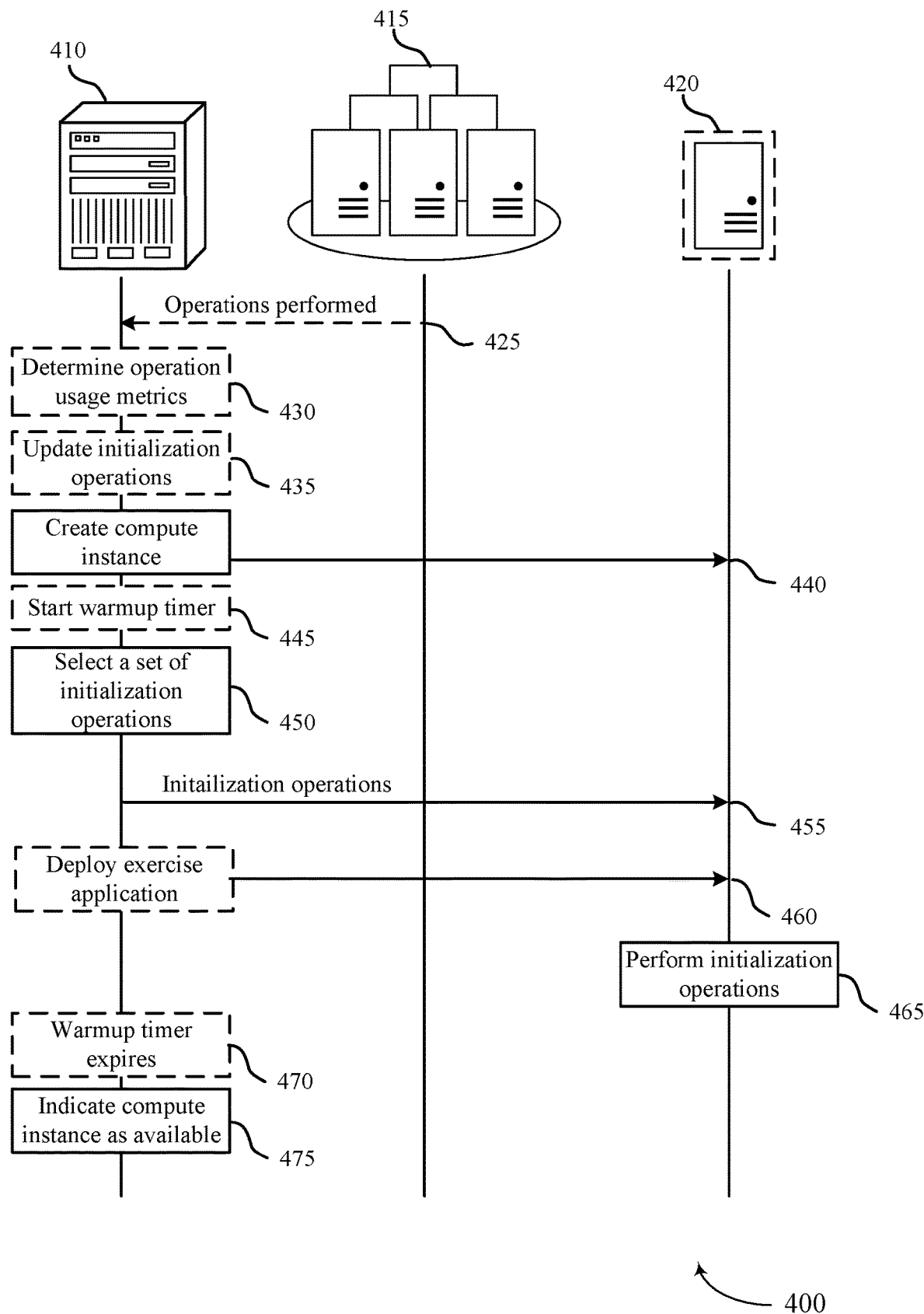
FIG. 4 illustrates an example of a process flow that supports compute instance warmup procedures in accordance with aspects of the present disclosure.

FIG. 4 illustrates an example of a process flow 400 that supports compute instance warmup procedures in accordance with aspects of the present disclosure. The process flow 400 may include an application server 410, a compute instance pool 415, and a compute instance 420 to be warmed up. In the following description of the process flow 400, the operations between application server 410, the compute instance pool 415, and the compute instance 420 may be performed in different orders or at different times. Some operations may also be left out of the process flow 400, or other operations may be added. Although application server 410, the compute instance pool 415, and the compute instance 420 are shown performing the operations of the process flow 400, some aspects of some operations may also be performed by one or more other devices, or may be performed by other devices included in the process flow (e.g., an operation performed by the application server 410 may instead be performed by the compute instance 420 or the compute instance pool 415).

At 425, the application server 410 may monitor one or more compute instances in the pool of compute instances. The application server 410 may further determine, based on the monitoring, one or more operations performed by the one or more compute instances. The application server 410 may further store one or more indications of the one or more operations performed by the one or more compute instances.

At 430, the application server 410 may determine the one or more operation usage metrics based on a successful execution of one or more operations, an unsuccessful execution of one or more operations, a number of executions of one or more operations, one or more operation metric thresholds, or a combination thereof.

At 435, the application server 410 may automatically update the plurality of available initialization operations to include a latest version of one or more of the plurality of available initialization operations. The application server

410 may further remove an operation from the selected set of initialization operations or from the plurality of available initialization operations.

At 440, the application server 410 may create a compute instance associated with a pool of compute instances. At 445, the application server 410 may start a warmup timer based on detecting that the compute instance warmup process has begun.

At 450, the application server 410 may select based on one or more operation usage metrics that indicate operations previously performed by compute instances in the pool of compute instances, a set of initialization operations from a plurality of available initialization operations. In some examples, the plurality of available initialization operations may include obtaining one or more dependencies associated with an operation, loading a class, deploying an application, or a combination thereof. In some examples, selecting the set of initialization operations may be based on one or more operation usage metrics associated with a time period. In some examples, the plurality of available initialization operations may include a list of approved initialization operations. In some examples, the selecting may be based at least in part on a user identifier, an organization associated with a user identifier, or a combination thereof.

At 455, the compute instance 420 may retrieve, at the compute instance, the set of initialization operations based at least in part on the selecting.

At 460, the application server 410 may deploy an initialization operation exercise application associated with the set of initialization operations. For example, the compute instance 420 may execute the exercise application to perform the set of initialization operations.

At 465, the compute instance 420 may perform the set of initialization operations with the compute instance as part of a compute instance warmup process in response to the compute instance being created. In some examples, the compute instance 420 may perform the set of initialization operations with the initialization operation exercise application in response to the compute instance being created.

At 470, the warmup timer may expire. At 475, the application server 410 may indicate the compute instance as an available compute instance in the pool of compute instances based at least in part on the warmup timer expiring and determining that at least a portion of the compute instance warmup process was not performed successfully.

Figure 5:
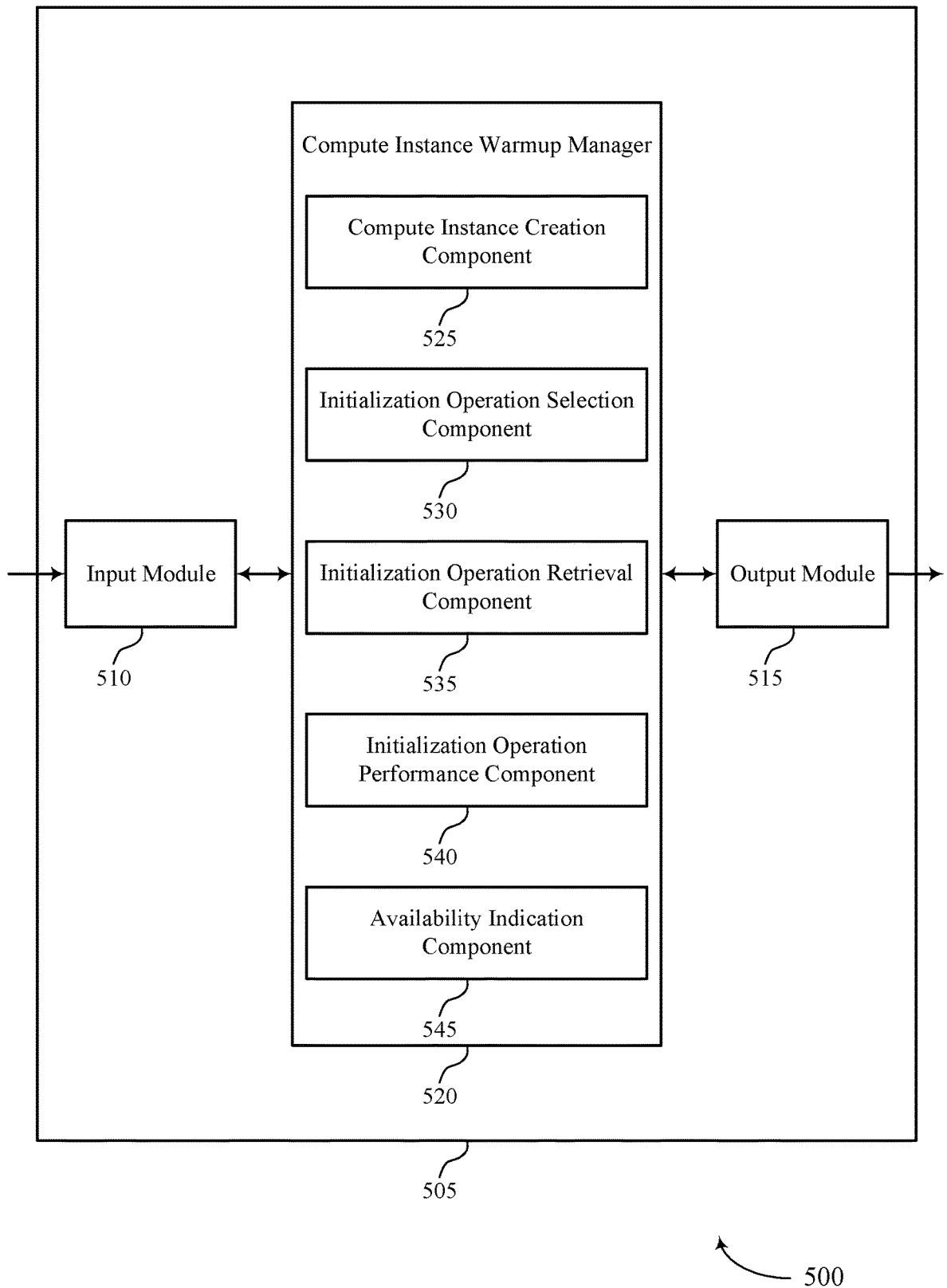
FIG. 5 shows a block diagram of an apparatus that supports compute instance warmup procedures in accordance with aspects of the present disclosure.

FIG. 5 shows a block diagram 500 of a device 505 that supports compute instance warmup procedures in accordance with aspects of the present disclosure. The device 505 may include an input module 510, an output module 515, and a compute instance warmup manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the compute instance warmup manager 520 to support compute instance warmup procedures. In some cases, the input module 510 may be a component of an I/O controller 710 as described with reference to FIG. 7.

The output module 515 may manage output signals for the device 505. For example, the output module 515 may receive signals from other components of the device 505, such as the compute instance warmup manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the compute instance warmup manager 520 may include a compute instance creation component 525, an initialization operation selection component 530, an initialization operation retrieval component 535, an initialization operation performance component 540, an availability indication component 545, or any combination thereof. In some examples, the compute instance warmup manager 520, or various components thereof, may be configured to perform various operations (e.g., receiving, monitoring, transmitting) using or otherwise in cooperation with the input module 510, the output module 515, or both. For example, the compute instance warmup manager 520 may receive information from the input module 510, send information to the output module 515, or be integrated in combination with the input module 510, the output module 515, or both to receive information, transmit information, or perform various other operations as described herein.

The compute instance warmup manager 520 may support data processing at an application server in accordance with examples as disclosed herein. The compute instance creation component 525 may be configured as or otherwise support a means for creating a compute instance associated with a pool of compute instances. The initialization operation selection component 530 may be configured as or otherwise support a means for selecting, based at least in part on one or more operation usage metrics that indicate operations previously performed by compute instances in the pool of compute instances, a set of initialization operations from a plurality of available initialization operations. The initialization operation retrieval component 535 may be configured as or otherwise support a means for retrieving, at the compute instance, the set of initialization operations based at least in part on the selecting. The initialization operation performance component 540 may be configured as or otherwise support a means for performing the set of initialization operations with the compute instance as part of a compute instance warmup process in response to the compute instance being created. The availability indication component 545 may be configured as or otherwise support a means for indicating the compute instance as an available compute instance in the pool of compute instances based at least in part on the compute instance warmup process.

Figure 6:
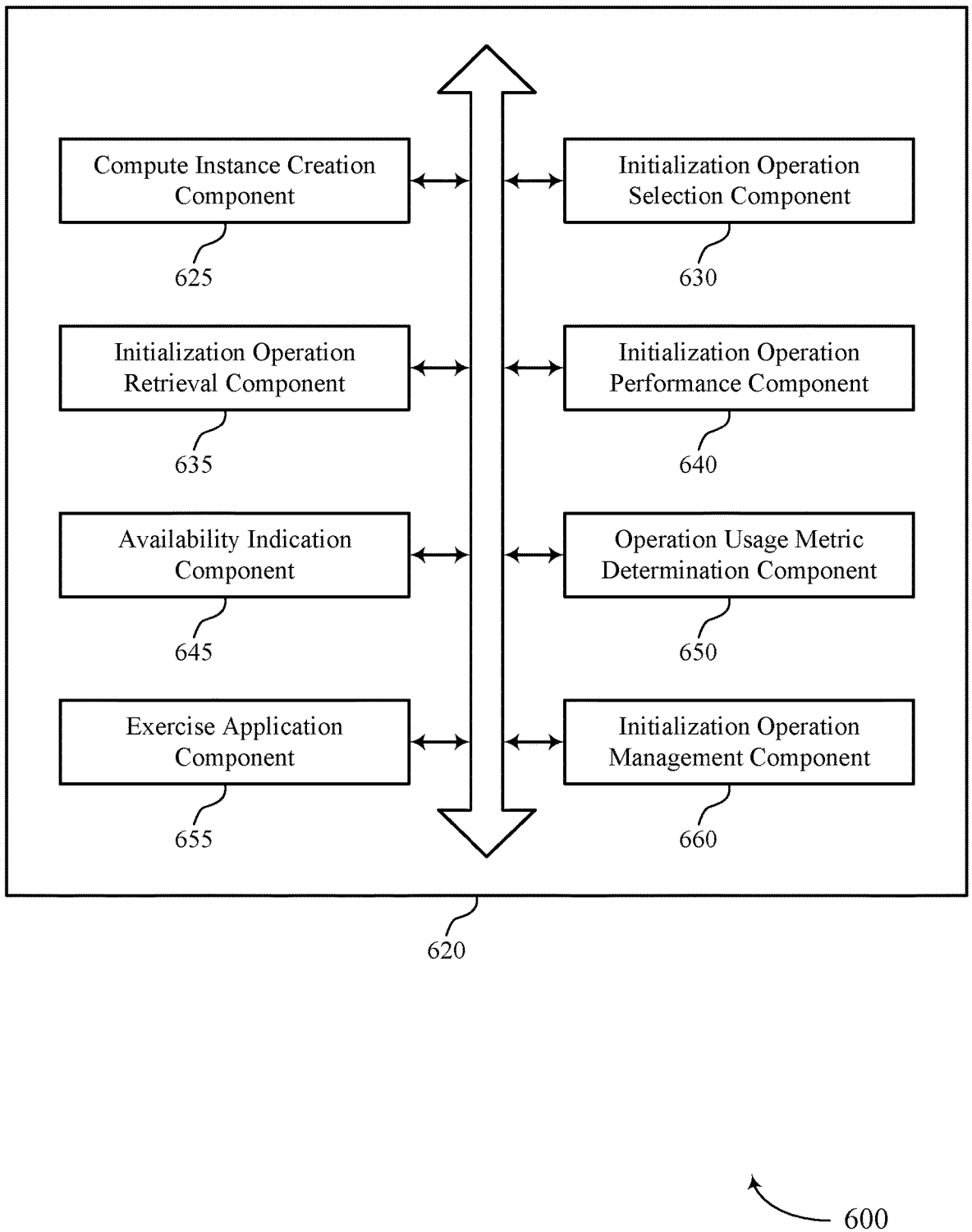
FIG. 6 shows a block diagram of a compute instance warmup manager that supports compute instance warmup procedures in accordance with aspects of the present disclosure.

FIG. 6 shows a block diagram 600 of a compute instance warmup manager 620 that supports compute instance warmup procedures in accordance with aspects of the present disclosure. The compute instance warmup manager 620 may be an example of aspects of a compute instance warmup manager or a compute instance warmup manager 520, or both, as described herein. The compute instance warmup manager 620, or various components thereof, may be an example of means for performing various aspects of compute instance warmup procedures as described herein. For example, the compute instance warmup manager 620 may include a compute instance creation component 625, an initialization operation selection component 630, an initialization operation retrieval component 635, an initialization operation performance component 640, an availability indication component 645, an operation usage metric determination component 650, an exercise application component 655, an initialization operation management component 660, or any combination thereof. Each of these components may communicate, directly or indirectly, with one another (e.g., via one or more buses).

The compute instance warmup manager 620 may support data processing at an application server in accordance with examples as disclosed herein. The compute instance creation component 625 may be configured as or otherwise support a means for creating a compute instance associated with a pool of compute instances. The initialization operation selection component 630 may be configured as or otherwise support a means for selecting, based at least in part on one or more operation usage metrics that indicate operations previously performed by compute instances in the pool of compute instances, a set of initialization operations from a plurality of available initialization operations. The initialization operation retrieval component 635 may be configured as or otherwise support a means for retrieving, at the compute instance, the set of initialization operations based at least in part on the selecting. The initialization operation performance component 640 may be configured as or otherwise support a means for performing the set of initialization operations with the compute instance as part of a compute instance warmup process in response to the compute instance being created. The availability indication component 645 may be configured as or otherwise support a means for indicating the compute instance as an available compute instance in the pool of compute instances based at least in part on the compute instance warmup process.

In some examples, the operation usage metric determination component 650 may be configured as or otherwise support a means for determining the one or more operation usage metrics based at least in part on a successful execution of one or more operations, an unsuccessful execution of one or more operations, a number of executions of one or more operations, one or more operation metric thresholds, or a combination thereof.

In some examples, the exercise application component 655 may be configured as or otherwise support a means for deploying an initialization operation exercise application associated with the set of initialization operations. In some examples, the initialization operation performance component 640 may be configured as or otherwise support a means for performing the set of initialization operations with the initialization operation exercise application in response to the compute instance being created.

In some examples, the initialization operation management component 660 may be configured as or otherwise support a means for monitoring one or more compute instances in the pool of compute instances. In some examples, the initialization operation management component 660 may be configured as or otherwise support a means for determining, based at least in part on the monitoring, one or more operations performed by the one or more compute instances. In some examples, the initialization operation management component 660 may be configured as or otherwise support a means for storing one or more indications of the one or more operations performed by the one or more compute instances.

In some examples, the initialization operation performance component 640 may be configured as or otherwise support a means for starting a warmup timer based at least in part on detecting that the compute instance warmup process has begun. In some examples, the availability indication component 645 may be configured as or otherwise support a means for indicating the compute instance as an available compute instance in the pool of compute instances based at least in part on the warmup timer expiring and determining that at least a portion of the compute instance warmup process was not performed successfully.

In some examples, the plurality of available initialization operations comprises obtaining one or more dependencies associated with an operation, loading a class, deploying an application, or a combination thereof.

In some examples, the initialization operation management component 660 may be configured as or otherwise support a means for automatically updating the plurality of available initialization operations to include a latest version of one or more of the plurality of available initialization operations. In some examples, selecting the set of initialization operations is based at least in part on one or more operation usage metrics associated with a time period. In some examples, the plurality of available initialization operations comprises a list of approved initialization operations.

In some examples, the initialization operation management component 660 may be configured as or otherwise support a means for removing an operation from the selected set of initialization operations or from the plurality of available initialization operations.

In some examples, the selecting is based at least in part on a user identifier, an organization associated with a user identifier, or a combination thereof.

Figure 7:
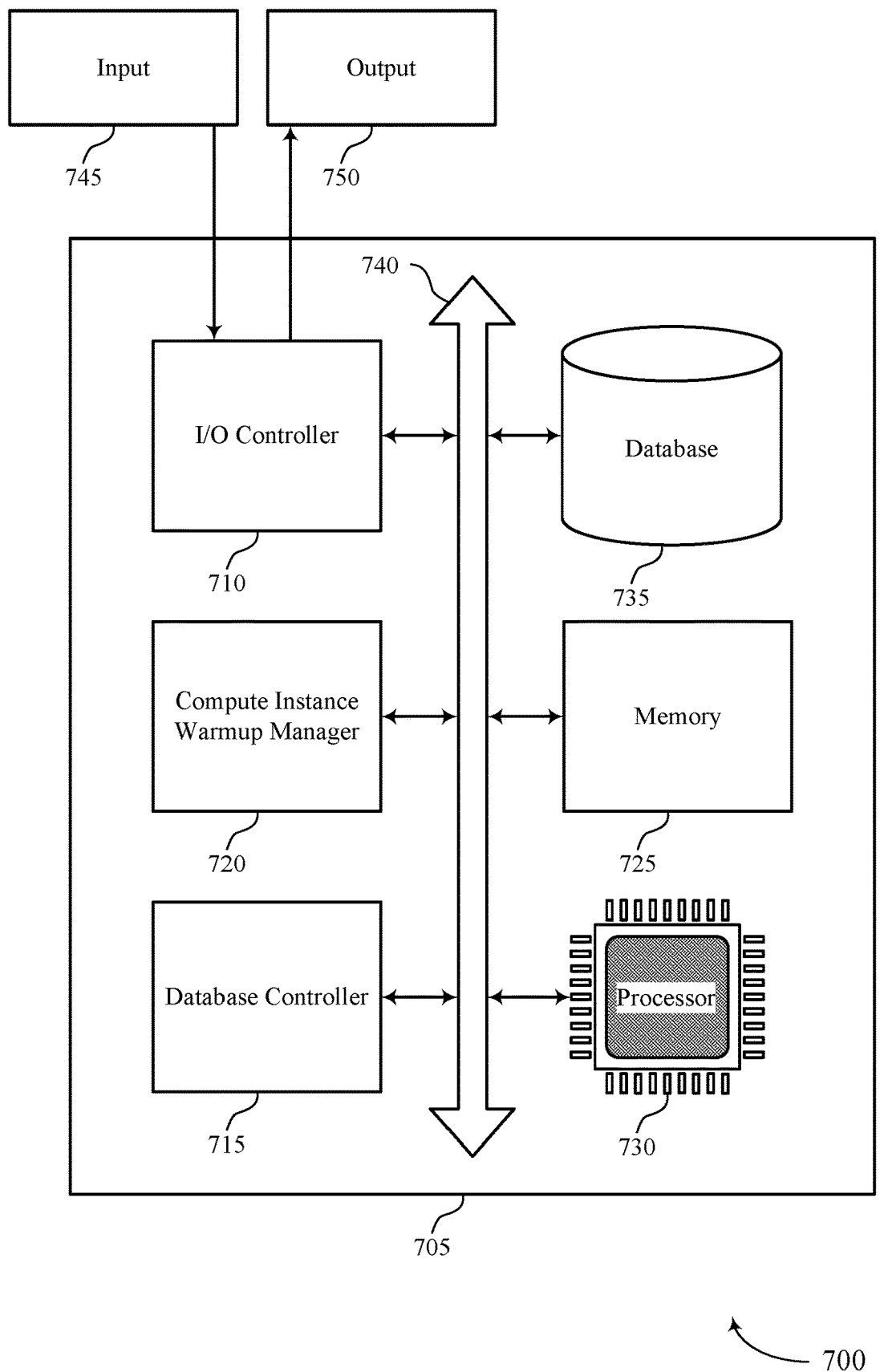
FIG. 7 shows a diagram of a system including a device that supports compute instance warmup procedures in accordance with aspects of the present disclosure.

FIG. 7 shows a diagram of a system 700 including a device 705 that supports compute instance warmup procedures in accordance with aspects of the present disclosure. The device 705 may be an example of or include the components of a device 505 as described herein. The device 705 may include components for bi-directional data communications including components for transmitting and receiving communications, such as a compute instance warmup manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting compute instance warmup procedures).

The compute instance warmup manager 720 may support data processing at an application server in accordance with examples as disclosed herein. For example, the compute instance warmup manager 720 may be configured as or otherwise support a means for creating a compute instance associated with a pool of compute instances. The compute instance warmup manager 720 may be configured as or otherwise support a means for selecting, based at least in part on one or more operation usage metrics that indicate operations previously performed by compute instances in the pool of compute instances, a set of initialization operations from a plurality of available initialization operations. The compute instance warmup manager 720 may be configured as or otherwise support a means for retrieving, at the compute instance, the set of initialization operations based at least in part on the selecting. The compute instance warmup manager 720 may be configured as or otherwise support a means for performing the set of initialization operations with the compute instance as part of a compute instance warmup process in response to the compute instance being created. The compute instance warmup manager 720 may be configured as or otherwise support a means for indicating the compute instance as an available compute instance in the pool of compute instances based at least in part on the compute instance warmup process.

By including or configuring the compute instance warmup manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

Figure 8:
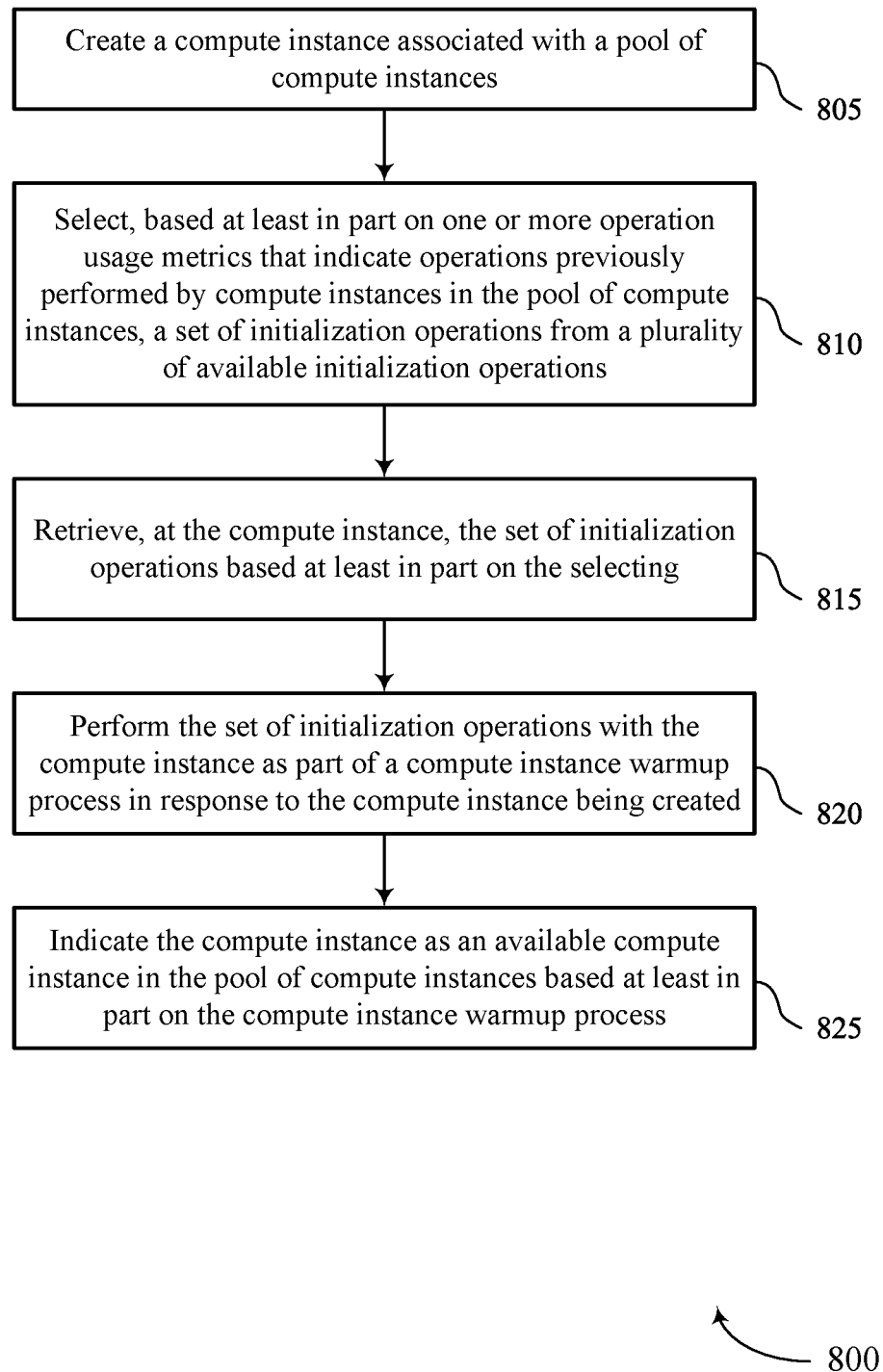
FIGS. 8 through 11 show flowcharts illustrating methods that support compute instance warmup procedures in accordance with aspects of the present disclosure.

FIG. 8 shows a flowchart illustrating a method 800 that supports compute instance warmup procedures in accordance with aspects of the present disclosure. The operations of the method 800 may be implemented by an application server or its components as described herein. For example, the operations of the method 800 may be performed by an application server as described with reference to FIGS. 1 through 7. In some examples, an application server may execute a set of instructions to control the functional elements of the Application server to perform the described functions. Additionally or alternatively, the Application server may perform aspects of the described functions using special-purpose hardware.

At 805, the method may include creating a compute instance associated with a pool of compute instances. The operations of 805 may be performed in accordance with examples as disclosed herein. In some examples, aspects of the operations of 805 may be performed by a compute instance creation component 625 as described with reference to FIG. 6.

At 810, the method may include selecting, based at least in part on one or more operation usage metrics that indicate operations previously performed by compute instances in the pool of compute instances, a set of initialization operations from a plurality of available initialization operations. The operations of 810 may be performed in accordance with examples as disclosed herein. In some examples, aspects of the operations of 810 may be performed by an initialization operation selection component 630 as described with reference to FIG. 6.

At 815, the method may include retrieving, at the compute instance, the set of initialization operations based at least in part on the selecting. The operations of 815 may be performed in accordance with examples as disclosed herein. In some examples, aspects of the operations of 815 may be performed by an initialization operation retrieval component 635 as described with reference to FIG. 6.

At 820, the method may include performing the set of initialization operations with the compute instance as part of a compute instance warmup process in response to the compute instance being created. The operations of 820 may be performed in accordance with examples as disclosed herein. In some examples, aspects of the operations of 820 may be performed by an initialization operation performance component 640 as described with reference to FIG. 6.

At 825, the method may include indicating the compute instance as an available compute instance in the pool of compute instances based at least in part on the compute instance warmup process. The operations of 825 may be performed in accordance with examples as disclosed herein. In some examples, aspects of the operations of 825 may be performed by an availability indication component 645 as described with reference to FIG. 6.

Figure 9:
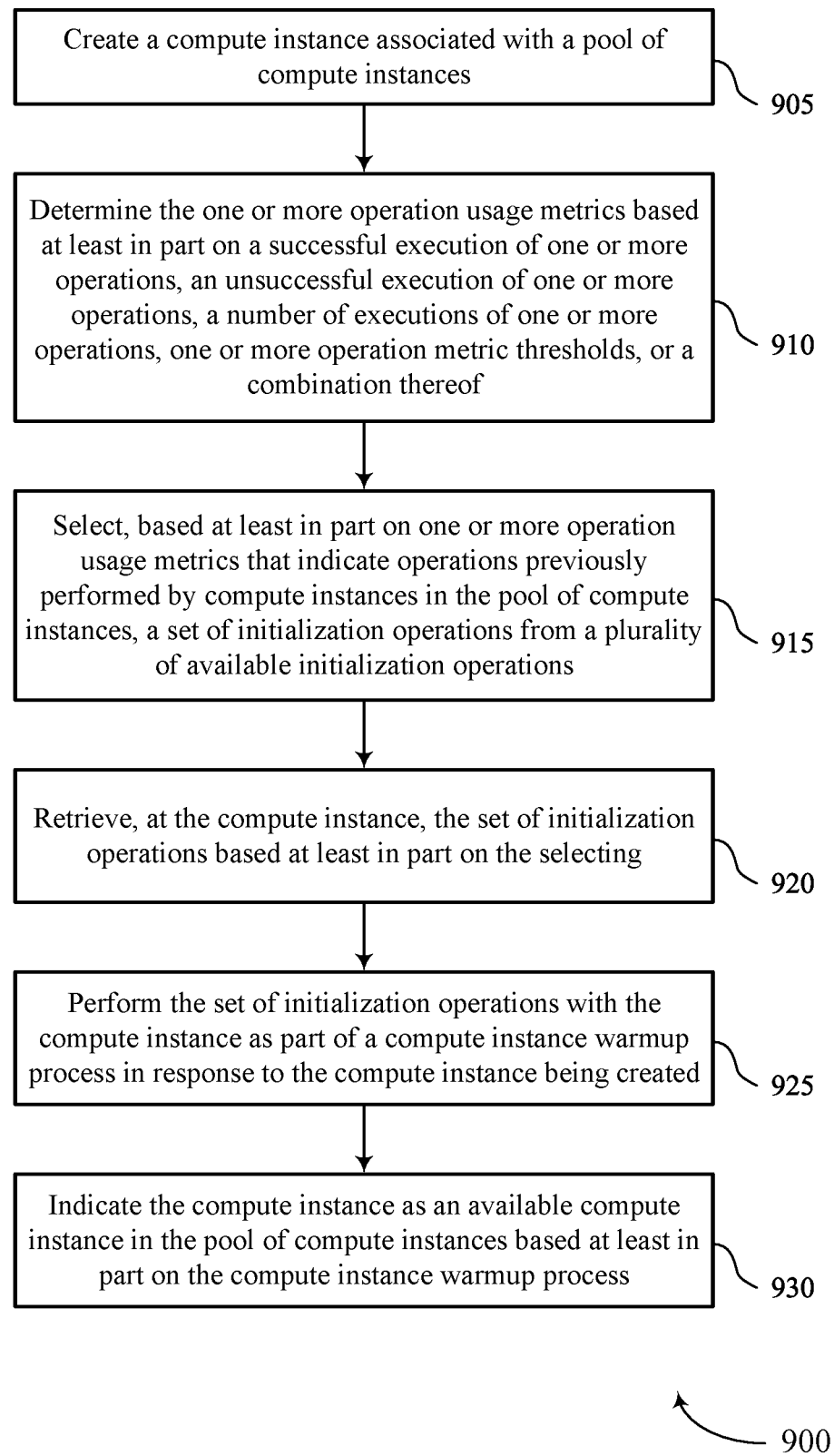

FIG. 9 shows a flowchart illustrating a method 900 that supports compute instance warmup procedures in accordance with aspects of the present disclosure. The operations of the method 900 may be implemented by an application server or its components as described herein. For example, the operations of the method 900 may be performed by an application server as described with reference to FIGS. 1 through 7. In some examples, an application server may execute a set of instructions to control the functional elements of the Application server to perform the described functions. Additionally or alternatively, the Application server may perform aspects of the described functions using special-purpose hardware.

At 905, the method may include creating a compute instance associated with a pool of compute instances. The operations of 905 may be performed in accordance with examples as disclosed herein. In some examples, aspects of the operations of 905 may be performed by a compute instance creation component 625 as described with reference to FIG. 6.

At 910, the method may include determining the one or more operation usage metrics based at least in part on a successful execution of one or more operations, an unsuccessful execution of one or more operations, a number of executions of one or more operations, one or more operation metric thresholds, or a combination thereof. The operations of 910 may be performed in accordance with examples as disclosed herein. In some examples, aspects of the operations of 910 may be performed by an operation usage metric determination component 650 as described with reference to FIG. 6.

At 915, the method may include selecting, based at least in part on one or more operation usage metrics that indicate operations previously performed by compute instances in the pool of compute instances, a set of initialization operations from a plurality of available initialization operations. The operations of 915 may be performed in accordance with examples as disclosed herein. In some examples, aspects of the operations of 915 may be performed by an initialization operation selection component 630 as described with reference to FIG. 6.

At 920, the method may include retrieving, at the compute instance, the set of initialization operations based at least in part on the selecting. The operations of 920 may be performed in accordance with examples as disclosed herein. In some examples, aspects of the operations of 920 may be performed by an initialization operation retrieval component 635 as described with reference to FIG. 6.

At 925, the method may include performing the set of initialization operations with the compute instance as part of a compute instance warmup process in response to the compute instance being created. The operations of 925 may be performed in accordance with examples as disclosed herein. In some examples, aspects of the operations of 925 may be performed by an initialization operation performance component 640 as described with reference to FIG. 6.

At 930, the method may include indicating the compute instance as an available compute instance in the pool of compute instances based at least in part on the compute instance warmup process. The operations of 930 may be performed in accordance with examples as disclosed herein. In some examples, aspects of the operations of 930 may be performed by an availability indication component 645 as described with reference to FIG. 6.

Figure 10:
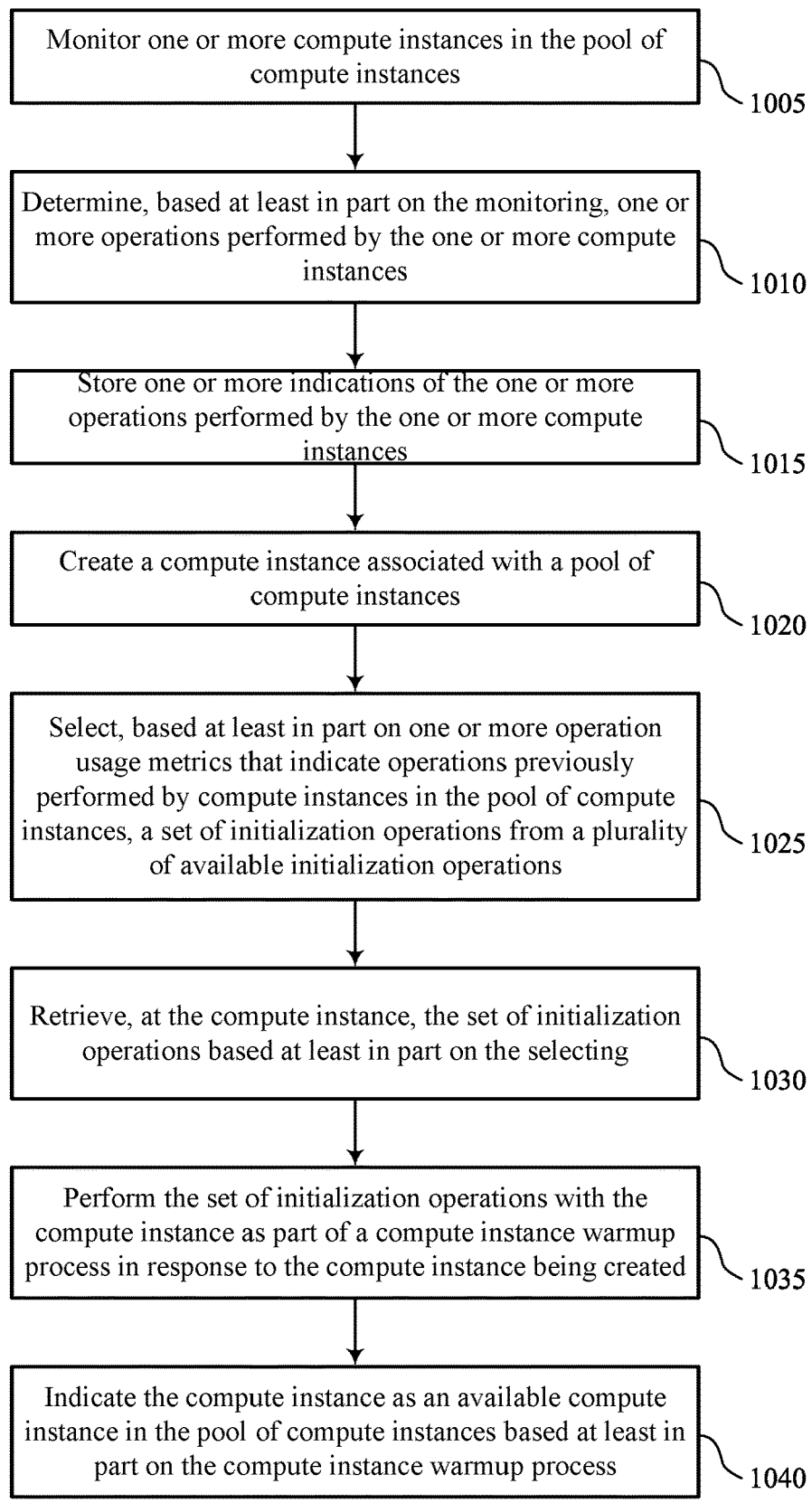

FIG. 10 shows a flowchart illustrating a method 1000 that supports compute instance warmup procedures in accordance with aspects of the present disclosure. The operations of the method 1000 may be implemented by an application server or its components as described herein. For example, the operations of the method 1000 may be performed by an application server as described with reference to FIGS. 1 through 7. In some examples, an application server may execute a set of instructions to control the functional elements of the Application server to perform the described functions. Additionally or alternatively, the Application server may perform aspects of the described functions using special-purpose hardware.

At 1005, the method may include monitoring one or more compute instances in the pool of compute instances. The operations of 1005 may be performed in accordance with examples as disclosed herein. In some examples, aspects of the operations of 1005 may be performed by an initialization operation management component 660 as described with reference to FIG. 6.

At 1010, the method may include determining, based at least in part on the monitoring, one or more operations performed by the one or more compute instances. The operations of 1010 may be performed in accordance with examples as disclosed herein. In some examples, aspects of the operations of 1010 may be performed by an initialization operation management component 660 as described with reference to FIG. 6.

At 1015, the method may include storing one or more indications of the one or more operations performed by the one or more compute instances. The operations of 1015 may be performed in accordance with examples as disclosed herein. In some examples, aspects of the operations of 1015 may be performed by an initialization operation management component 660 as described with reference to FIG. 6.

At 1020, the method may include creating a compute instance associated with a pool of compute instances. The operations of 1020 may be performed in accordance with examples as disclosed herein. In some examples, aspects of the operations of 1020 may be performed by a compute instance creation component 625 as described with reference to FIG. 6.

At 1025, the method may include selecting, based at least in part on one or more operation usage metrics that indicate operations previously performed by compute instances in the pool of compute instances, a set of initialization operations from a plurality of available initialization operations. The operations of 1025 may be performed in accordance with examples as disclosed herein. In some examples, aspects of the operations of 1025 may be performed by an initialization operation selection component 630 as described with reference to FIG. 6.

At 1030, the method may include retrieving, at the compute instance, the set of initialization operations based at least in part on the selecting. The operations of 1030 may be performed in accordance with examples as disclosed herein. In some examples, aspects of the operations of 1030 may be performed by an initialization operation retrieval component 635 as described with reference to FIG. 6.

At 1035, the method may include performing the set of initialization operations with the compute instance as part of a compute instance warmup process in response to the compute instance being created. The operations of 1035 may be performed in accordance with examples as disclosed herein. In some examples, aspects of the operations of 1035 may be performed by an initialization operation performance component 640 as described with reference to FIG. 6.

At 1040, the method may include indicating the compute instance as an available compute instance in the pool of compute instances based at least in part on the compute instance warmup process. The operations of 1040 may be performed in accordance with examples as disclosed herein. In some examples, aspects of the operations of 1040 may be performed by an availability indication component 645 as described with reference to FIG. 6.

Figure 11:
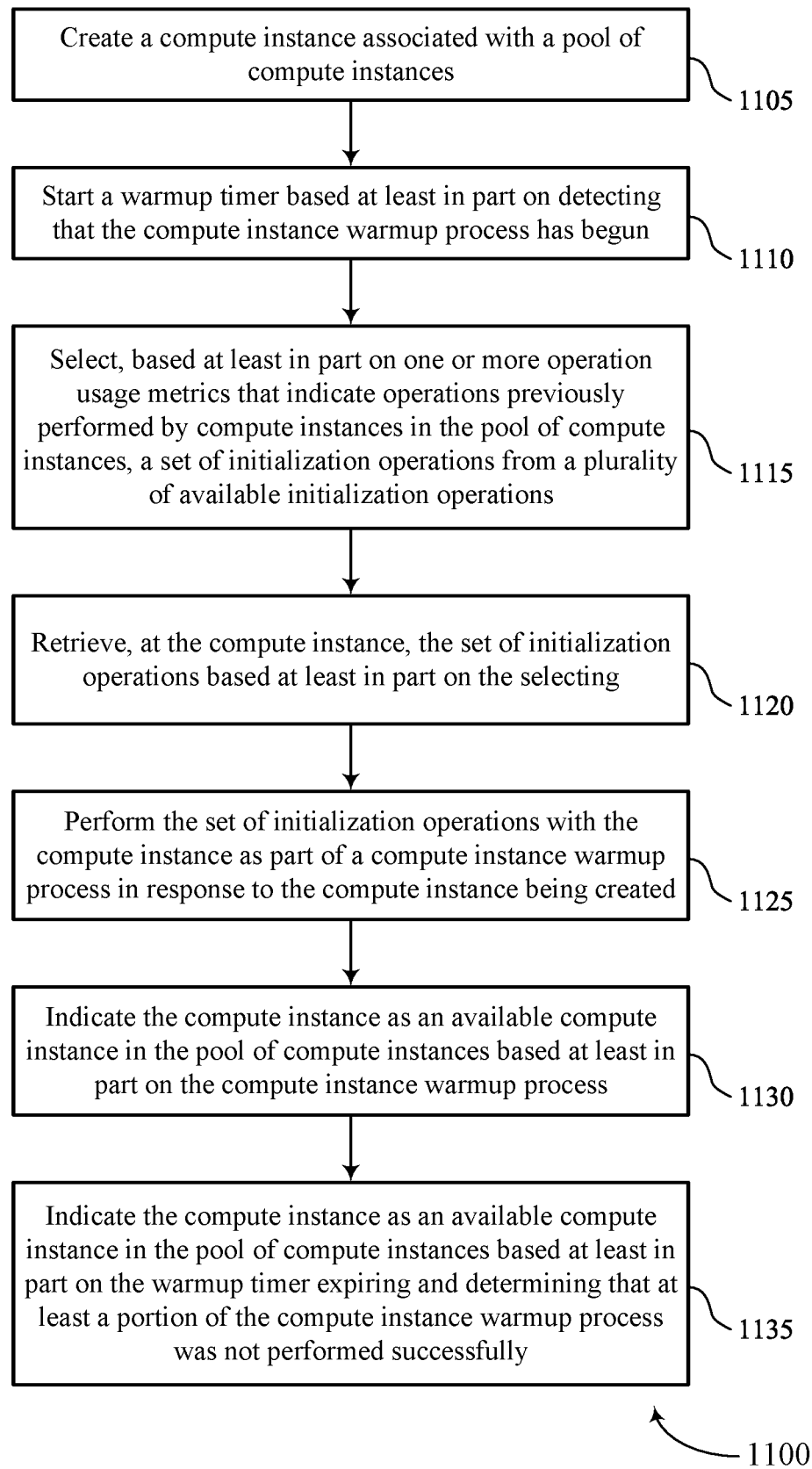

FIG. 11 shows a flowchart illustrating a method 1100 that supports compute instance warmup procedures in accordance with aspects of the present disclosure. The operations of the method 1100 may be implemented by an application server or its components as described herein. For example, the operations of the method 1100 may be performed by an application server as described with reference to FIGS. 1 through 7. In some examples, an application server may execute a set of instructions to control the functional elements of the Application server to perform the described functions. Additionally or alternatively, the Application server may perform aspects of the described functions using special-purpose hardware.

At 1105, the method may include creating a compute instance associated with a pool of compute instances. The operations of 1105 may be performed in accordance with examples as disclosed herein. In some examples, aspects of the operations of 1105 may be performed by a compute instance creation component 625 as described with reference to FIG. 6.

At 1110, the method may include starting a warmup timer based at least in part on detecting that the compute instance warmup process has begun. The operations of 1110 may be performed in accordance with examples as disclosed herein. In some examples, aspects of the operations of 1110 may be performed by an initialization operation performance component 640 as described with reference to FIG. 6.

At 1115, the method may include selecting, based at least in part on one or more operation usage metrics that indicate operations previously performed by compute instances in the pool of compute instances, a set of initialization operations from a plurality of available initialization operations. The operations of 1115 may be performed in accordance with examples as disclosed herein. In some examples, aspects of the operations of 1115 may be performed by an initialization operation selection component 630 as described with reference to FIG. 6.

At 1120, the method may include retrieving, at the compute instance, the set of initialization operations based at least in part on the selecting. The operations of 1120 may be performed in accordance with examples as disclosed herein. In some examples, aspects of the operations of 1120 may be performed by an initialization operation retrieval component 635 as described with reference to FIG. 6.

At 1125, the method may include performing the set of initialization operations with the compute instance as part of a compute instance warmup process in response to the compute instance being created. The operations of 1125 may be performed in accordance with examples as disclosed herein. In some examples, aspects of the operations of 1125 may be performed by an initialization operation performance component 640 as described with reference to FIG. 6.

At 1130, the method may include indicating the compute instance as an available compute instance in the pool of compute instances based at least in part on the compute instance warmup process. The operations of 1130 may be performed in accordance with examples as disclosed herein. In some examples, aspects of the operations of 1130 may be performed by an availability indication component 645 as described with reference to FIG. 6.

At 1135, the method may include indicating the compute instance as an available compute instance in the pool of compute instances based at least in part on the warmup timer expiring and determining that at least a portion of the compute instance warmup process was not performed successfully. The operations of 1135 may be performed in accordance with examples as disclosed herein. In some examples, aspects of the operations of 1135 may be performed by an availability indication component 645 as described with reference to FIG. 6.

A method for data processing at an application server is described. The method may include creating a compute instance associated with a pool of compute instances, selecting, based at least in part on one or more operation usage metrics that indicate operations previously performed by compute instances in the pool of compute instances, a set of initialization operations from a plurality of available initialization operations, retrieving, at the compute instance, the set of initialization operations based at least in part on the selecting, performing the set of initialization operations with the compute instance as part of a compute instance warmup process in response to the compute instance being created, and indicating the compute instance as an available compute instance in the pool of compute instances based at least in part on the compute instance warmup process.

An apparatus for data processing at an application server is described. The apparatus may include a processor, memory coupled with the processor, and instructions stored in the memory. The instructions may be executable by the processor to cause the apparatus to create a compute instance associated with a pool of compute instances, select, based at least in part on one or more operation usage metrics that indicate operations previously performed by compute instances in the pool of compute instances, a set of initialization operations from a plurality of available initialization operations, retrieve, at the compute instance, the set of initialization operations based at least in part on the selecting, perform the set of initialization operations with the compute instance as part of a compute instance warmup process in response to the compute instance being created, and indicate the compute instance as an available compute instance in the pool of compute instances based at least in part on the compute instance warmup process.

Another apparatus for data processing at an application server is described. The apparatus may include means for creating a compute instance associated with a pool of compute instances, means for selecting, based at least in part on one or more operation usage metrics that indicate operations previously performed by compute instances in the pool of compute instances, a set of initialization operations from a plurality of available initialization operations, means for retrieving, at the compute instance, the set of initialization operations based at least in part on the selecting, means for performing the set of initialization operations with the compute instance as part of a compute instance warmup process in response to the compute instance being created, and means for indicating the compute instance as an available compute instance in the pool of compute instances based at least in part on the compute instance warmup process.

A non-transitory computer-readable medium storing code for data processing at an application server is described. The code may include instructions executable by a processor to create a compute instance associated with a pool of compute instances, select, based at least in part on one or more operation usage metrics that indicate operations previously performed by compute instances in the pool of compute instances, a set of initialization operations from a plurality of available initialization operations, retrieve, at the compute instance, the set of initialization operations based at least in part on the selecting, perform the set of initialization operations with the compute instance as part of a compute instance warmup process in response to the compute instance being created, and indicate the compute instance as an available compute instance in the pool of compute instances based at least in part on the compute instance warmup process.

Some examples of the method, apparatuses, and non-transitory computer-readable medium described herein may further include operations, features, means, or instructions for determining the one or more operation usage metrics based at least in part on a successful execution of one or more operations, an unsuccessful execution of one or more operations, a number of executions of one or more operations, one or more operation metric thresholds, or a combination thereof.

Some examples of the method, apparatuses, and non-transitory computer-readable medium described herein may further include operations, features, means, or instructions for deploying an initialization operation exercise application associated with the set of initialization operations and performing the set of initialization operations with the initialization operation exercise application in response to the compute instance being created.

Some examples of the method, apparatuses, and non-transitory computer-readable medium described herein may further include operations, features, means, or instructions for monitoring one or more compute instances in the pool of compute instances, determining, based at least in part on the monitoring, one or more operations performed by the one or more compute instances, and storing one or more indications of the one or more operations performed by the one or more compute instances.

Some examples of the method, apparatuses, and non-transitory computer-readable medium described herein may further include operations, features, means, or instructions for starting a warmup timer based at least in part on detecting that the compute instance warmup process may have begun and indicating the compute instance as an available compute instance in the pool of compute instances based at least in part on the warmup timer expiring and determining that at least a portion of the compute instance warmup process was not performed successfully.

In some examples of the method, apparatuses, and non-transitory computer-readable medium described herein, the plurality of available initialization operations comprises obtaining one or more dependencies associated with an operation, loading a class, deploying an application, or a combination thereof.

In some examples of the method, apparatuses, and non-transitory computer-readable medium described herein, automatically updating the plurality of available initialization operations to include a latest version of one or more of the plurality of available initialization operations.

Some examples of the method, apparatuses, and non-transitory computer-readable medium described herein may further include operations, features, means, or instructions for selecting the set of initialization operations may be based at least in part on one or more operation usage metrics associated with a time period.

In some examples of the method, apparatuses, and non-transitory computer-readable medium described herein, the plurality of available initialization operations comprises a list of approved initialization operations.

Some examples of the method, apparatuses, and non-transitory computer-readable medium described herein may further include operations, features, means, or instructions for removing an operation from the selected set of initialization operations or from the plurality of available initialization operations.

In some examples of the method, apparatuses, and non-transitory computer-readable medium described herein, the selecting may be based at least in part on a user identifier, an organization associated with a user identifier, or a combination thereof.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at an application server, comprising:
   creating a compute instance associated with a pool of compute instances;
   selecting, based at least in part on one or more operation usage metrics that indicate operations previously performed by compute instances in the pool of compute instances, the one or more operation usage metrics further indicating identifiers of one or more services and that corresponding connections to the one or more services were established in association with the operations previously performed by the compute instances, a set of initialization operations from a plurality of available initialization operations, wherein the set of initialization operations corresponds with the operations previously performed by the compute instances in the pool of compute instances with which the compute instance is associated;
   retrieving, at the compute instance, the set of initialization operations based at least in part on the selecting;
   performing the set of initialization operations with the compute instance as part of a compute instance warmup process in response to the compute instance being created; and
   indicating the compute instance as an available compute instance in the pool of compute instances based at least in part on the compute instance warmup process.

2. The method of claim 1, further comprising:
   determining the one or more operation usage metrics based at least in part on a successful execution of one or more operations, an unsuccessful execution of one or more operations, a number of executions of one or more operations, one or more operation metric thresholds, or a combination thereof.

3. The method of claim 1, further comprising:
   deploying an initialization operation exercise application associated with the set of initialization operations; and
   performing the set of initialization operations with the initialization operation exercise application in response to the compute instance being created.

4. The method of claim 1, further comprising:
   monitoring one or more compute instances in the pool of compute instances;
   determining, based at least in part on the monitoring, one or more operations performed by the one or more compute instances; and
   storing one or more indications of the one or more operations performed by the one or more compute instances.

5. The method of claim 1, further comprising:
   starting a warmup timer based at least in part on detecting that the compute instance warmup process has begun; and
   indicating the compute instance as an available compute instance in the pool of compute instances based at least in part on the warmup timer expiring and determining that at least a portion of the compute instance warmup process was not performed successfully.

6. The method of claim 1, wherein the plurality of available initialization operations comprises obtaining one or more dependencies associated with an operation, loading a class, deploying an application, or a combination thereof.

7. The method of claim 1, further comprising:
   automatically updating the plurality of available initialization operations to include a latest version of one or more of the plurality of available initialization operations.

8. The method of claim 1, wherein selecting the set of initialization operations is based at least in part on one or more operation usage metrics associated with a time period.

9. The method of claim 1, wherein the plurality of available initialization operations comprises a list of approved initialization operations.

10. The method of claim 1, further comprising:
    removing an operation from the selected set of initialization operations or from the plurality of available initialization operations.

11. The method of claim 1, wherein the selecting is based at least in part on a user identifier, an organization associated with a user identifier, or a combination thereof.

12. An apparatus for data processing at an application server, comprising:
    one or more processors;
    one or more memories coupled with the one or more processors; and
    instructions stored in the one or more memories and executable by the one or more processors to cause the apparatus to:
    create a compute instance associated with a pool of compute instances;

select, based at least in part on one or more operation usage metrics that indicate operations previously performed by compute instances in the pool of compute instances, the one or more operation usage metrics further indicating identifiers of one or more services and that corresponding connections to the one or more services were established in association with the operations previously performed by the compute instances, a set of initialization operations from a plurality of available initialization operations, wherein the set of initialization operations corresponds with the operations previously performed by the compute instances in the pool of compute instances with which the compute instance is associated;

retrieve, at the compute instance, the set of initialization operations based at least in part on the selecting;

perform the set of initialization operations with the compute instance as part of a compute instance warmup process in response to the compute instance being created; and indicate the compute instance as an available compute instance in the pool of compute instances based at least in part on the compute instance warmup process.

13. The apparatus of claim 12, wherein the instructions are further executable by the one or more processors to cause the apparatus to:

determine the one or more operation usage metrics based at least in part on a successful execution of one or more operations, an unsuccessful execution of one or more operations, a number of executions of one or more operations, one or more operation metric thresholds, or a combination thereof.

14. The apparatus of claim 12, wherein the instructions are further executable by the one or more processors to cause the apparatus to:

deploy an initialization operation exercise application associated with the set of initialization operations; and perform the set of initialization operations with the initialization operation exercise application in response to the compute instance being created.

15. The apparatus of claim 12, wherein the instructions are further executable by the one or more processors to cause the apparatus to:

monitor one or more compute instances in the pool of compute instances;

determine, based at least in part on the monitoring, one or more operations performed by the one or more compute instances; and store one or more indications of the one or more operations performed by the one or more compute instances.

16. The apparatus of claim 12, wherein the instructions are further executable by the one or more processors to cause the apparatus to:

start a warmup timer based at least in part on detecting that the compute instance warmup process has begun; and indicate the compute instance as an available compute instance in the pool of compute instances based at least in part on the warmup timer expiring and determining that at least a portion of the compute instance warmup process was not performed successfully.

17. The apparatus of claim 12, wherein the plurality of available initialization operations comprises obtaining one or more dependencies associated with an operation, loading a class, deploying an application, or a combination thereof.

18. A non-transitory computer-readable medium storing code for data processing at an application server, the code comprising instructions executable by a processor to:

create a compute instance associated with a pool of compute instances;

select, based at least in part on one or more operation usage metrics that indicate operations previously performed by compute instances in the pool of compute instances, the one or more operation usage metrics further indicating identifiers of one or more services and that corresponding connections to the one or more services were established in association with the operations previously performed by the compute instances, a set of initialization operations from a plurality of available initialization operations, wherein the set of initialization operations corresponds with the operations previously performed by the compute instances in the pool of compute instances with which the compute instance is associated;

retrieve, at the compute instance, the set of initialization operations based at least in part on the selecting;

perform the set of initialization operations with the compute instance as part of a compute instance warmup process in response to the compute instance being created; and indicate the compute instance as an available compute instance in the pool of compute instances based at least in part on the compute instance warmup process.

19. The non-transitory computer-readable medium of claim 18, wherein the instructions are further executable by the processor to:

deploy an initialization operation exercise application associated with the set of initialization operations; and perform the set of initialization operations with the initialization operation exercise application in response to the compute instance being created.

20. The non-transitory computer-readable medium of claim 18, wherein the instructions are further executable by the processor to:

monitor one or more compute instances in the pool of compute instances;

determine, based at least in part on the monitoring, one or more operations performed by the one or more compute instances; and store one or more indications of the one or more operations performed by the one or more compute instances.

* * * * *